Jan. 26, 1943.  R. TAMPIER  2,309,550
RETRACTABLE UNDERCARRIAGE FOR AIRCRAFT
Filed July 18, 1940
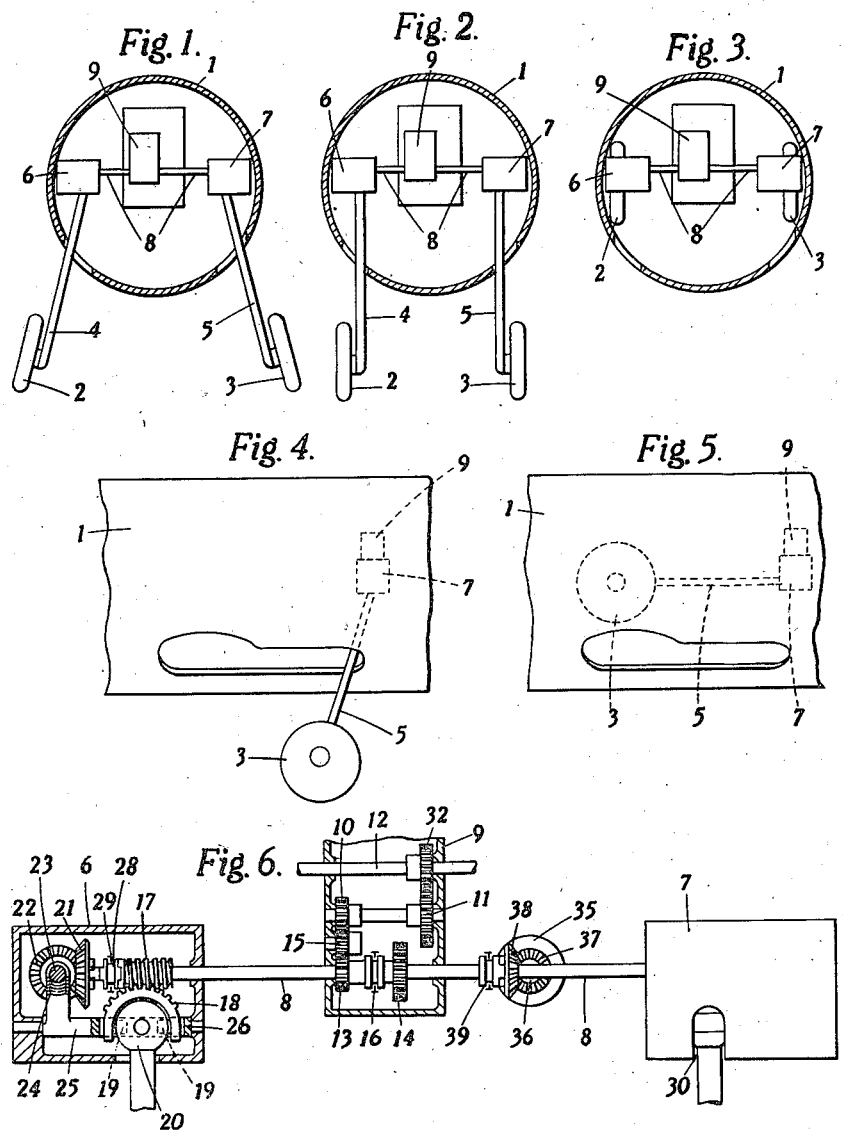
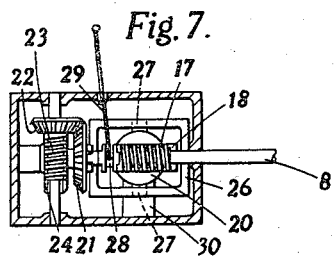
Inventor
René Tampier
by
A. Knight Cerod
Attorney Patented Jan. 26, 1943

2,309,550

UNITED STATES PATENT OFFICE 2,309,550

RETRACTABLE UNDERCARRIAGE FOR AIRCRAFT

René Tampier, Cricklewood, London, England

Application July 18, 1940, Serial No. 346,198
In Great Britain June 6, 1940

4 Claims. (Cl. 244—102)

This invention relates to retractable undercarriages for aircraft.

The object of the invention is to provide a two-wheeled undercarriage which can be withdrawn completely into the fuselage of an aircraft by means of a compact, robust and reliable operating mechanism which can readily be totally enclosed in a casing.

The invention is illustrated in the accompanying drawing wherein—

Figures 1–3 are diagrammatic front elevational views of a two-wheeled undercarriage supported in the fuselage of an aircraft;

Figures 4 and 5 are diagrammatic side views;

Figure 6 is a front elevation (partly in section) of the mechanism for operating the landing wheels, and Figure 7 is a sectional plan view of one of the gear boxes shown in Figure 6.

In the drawing 1 is the fuselage of an aircraft having a two-wheeled undercarriage comprising the wheels 2, 3 carried respectively on spindles 4, 5 the upper ends of which are supported in gear boxes 6, 7, one of which is shown in section in Figures 6 and 7.

The drive to the two gear boxes is through a shaft 8, common to both boxes, driven from the aircraft engine through a reversing gear enclosed in a box 9 and comprising two fixed gears 10, 11 on a shaft 12, two movable gears 13, 14 slidably arranged as a unit on shaft 8, and an intermediate gear 15. The drive in one direction is through gears 10, 15, 13 and in the other direction through gears 11, 14, either of which set of gears is brought into operation by a fork 16 arranged to slide the gears 13, 14 into and out of engagement respectively with the gears 15, and 11, the shaft 12 being driven at all times by gear 11 driven by a gear 32 driven from the engine.

The gearing in each gear box comprises a worm 17, loose on the shaft 8, meshing with a quadrant gear 18, having forked ends 19 engaging in a ball 20 fixed to the top of the wheel spindle 4 or 5, and a bevel gear 21, also loose on the shaft 8 and meshing with a second bevel gear 22 solid with a worm 23 meshing with a toothed quadrant 24 fixed to a spindle 25 rotatably mounted in bearings in the wall of the gear box. The spindle 25 carries a rectangular frame 26 formed with inwardly extending pin-like projections 27 engaging in the ball 20.

The arrangement is such that either the worm or bevel gear 21 can be connected to the shaft 8 by a double dog clutch 28 slidingly mounted on the shaft 8 and adapted to be slid by a clutch fork 29, operable from the cockpit, to engage complementary clutch parts carried on the opposing faces of the worm 17 and bevel gear 21.

The wall of each gear box is suitably slotted as shown at 30 to permit the required movement of the spindles. The fuselage is also slotted to permit the necessary movement of the spindles and landing wheels.

Assuming the undercarriage is in the lowered position, as in Figure 1, in order to retract the landing wheels into the position shown in Figure 3, they are moved first transversely into the position shown in Figure 2 and they are then raised parallel to the fuselage. The first movement is effected by connecting the clutch 28 to the worm 17, as shown in Figure 6, whereupon the worm drives the quadrant 18 and moves the spindles transversely from the position shown in Figure 1 to the position shown in Figure 2. The clutch 28 is then connected to the bevel gear 21 which drives the gearing 22—24 to rock the frame 26 and consequently the spindle 4 (5) about the axis of the spindle 25 to raise the landing wheel into the retracted position shown in Figure 3.

In order to lower the undercarriage the operation is reversed, the shaft 8 being then driven in the opposite direction by sliding the gear 14 into engagement with the gear 11.

In case of engine failure the shaft 8 may be driven from an electric motor 35 through shaft 36, bevel gears 37, 38 and clutch 39.

Cam or other known devices may be provided to disconnect automatically the drive when the spindles 4, 5 have been moved to limit positions.

The gear box 9 may be attached to, or incorporated in, a change speed gear arranged to change the speed of the propeller drive.

The dog clutch described may be replaced by a clutch of another kind, for example a friction clutch.

What I claim is:

1. In an aircraft, a retractable undercarriage comprising two spindles, a landing wheel supported on each spindle at one end thereof, a fuselage having two apertures through which the landing wheels can be passed, a driving shaft, gearing operatively disposed between the driving shaft and each of said spindles, said gearing being adapted to rock each of said spindles and the wheels carried thereon successively around two axes disposed respectively substantially parallel with, and transversely of, the fuselage.

2. A retractable undercarriage according to claim 1 further comprising, two gear boxes mounted on the driving shaft into which the two spindle heads respectively project, two sets of worm and quadrant gearing in each gear box adapted to transmit motion from the driving shaft to the head of the spindle projecting into the gear box, and a clutch for connecting either one of said sets of worm and quadrant gearing to the driving shaft.

3. A retractable undercarriage according to claim 1, further comprising, two gear boxes mounted on the driving shaft into which the two spindle heads respectively project, two sets of worm and quadrant gearing in each gear box adapted to transmit motion from the driving shaft to the head of the spindle projecting into the gear box, a clutch for connecting either one of said sets of worm and quadrant gearing to the driving shaft, and a reversing gear operatively connected between the power unit of the aircraft and the said driving shaft.

4. In an aircraft, a retractable undercarriage comprising two spindles, a landing wheel supported on each spindle at one end thereof, a fuselage having apertures through which the spindles and landing wheels can be passed, means for moving each spindle longitudinally and transversely of the aperture with which it is associated, said means comprising a spherical head to said spindle, a frame connected to said head, a gear element connected to said spindle head, a driving shaft, clutch-controlled gearing operatively disposed between said driving shaft and said frame, and clutch controlled gearing operatively disposed between said driving shaft and said gear element.

RENÉ TAMPIER.